United States Patent
Bossi et al.

(10) Patent No.: US 12,511,620 B2
(45) Date of Patent: Dec. 30, 2025

(54) SELECTIVELY DISPOSING OF A PHYSICAL ASSET

(71) Applicant: International Business Machines Corporation, Armonk, NY (US)

(72) Inventors: Aline Bossi, Piracicaba (BR); Ana Paula Appel, São Paulo (BR); Anderson Luis de Paula Silva, Cotia (BR); Carlos Lessandro Lopes Rischioto, São Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 221 days.

(21) Appl. No.: 18/472,699

(22) Filed: Sep. 22, 2023

(65) Prior Publication Data

US 2025/0104010 A1     Mar. 27, 2025

(51) Int. Cl.
G06Q 10/087     (2023.01)
(52) U.S. Cl.
CPC .................. G06Q 10/087 (2013.01)
(58) Field of Classification Search
CPC .................................................. G06Q 10/087
See application file for complete search history.

(56) References Cited

U.S. PATENT DOCUMENTS

| | | |
|---|---|---|
| 7,931,197 B2 | 4/2011 | Brandt et al. |
| 11,120,365 B2 | 9/2021 | Campos et al. |
| 11,354,131 B2 | 6/2022 | Balasubramanian et al. |
| 2006/0235808 A1 | 10/2006 | Berry |
| 2007/0063029 A1 | 3/2007 | Brandt |
| 2016/0217214 A1* | 7/2016 | Goncalves ............. G06Q 40/02 |

(Continued)

FOREIGN PATENT DOCUMENTS

| | | |
|---|---|---|
| AU | 2010295352 A1 | 4/2012 |
| CN | 1924914 A | 4/2016 |

(Continued)

OTHER PUBLICATIONS

Invgate, "A unified view of your IT Infrastructure," https://invgate.com/insight/?hsCtaTracking=d3bfdd3e-ead9-422b-9700-363b0335fd85%7C481d4fd6-bad5-4f98-a8c1-e381d2337a5e, Retrieved from the Internet: Aug. 21, 2023.
Axeleo, "5 Ways AI is Changing the Real Estate Sector," https://medium.com/axeleo/5-ways-ai-is-changing-the-real-estate-sector-a726bf600a83, Dec. 10, 2019.
AI Superior, "How Machine Learning is Revolutionising the Real Estate Sector," https://aisuperior.com/blog/how-machine-learning-is-revolutionising-the-real-estate-sector/, Nov. 21, 2022.

(Continued)

*Primary Examiner* — Garcia Ade
(74) *Attorney, Agent, or Firm* — Amin, Turocy & Watson, LLP

(57) ABSTRACT

Techniques regarding selectively disposing of a physical asset are provided. For example, one or more embodiments described herein can comprise a system, which can comprise a memory that can store computer executable components. The system can also comprise a processor, operably coupled to the memory, and that can execute the computer executable components stored in the memory. The computer executable components can include a disposition component that can select a disposition for a physical asset of an organization based on a characteristic of the physical asset and a machine learning model trained based on dispositions of other physical assets of the organization. The computer executable components can include an assignment component that can assign the physical asset to the disposition, resulting in an assigned disposition.

20 Claims, 9 Drawing Sheets

(56) References Cited

U.S. PATENT DOCUMENTS

| | | | |
|---|---|---|---|
| 2017/0010149 A1* | 1/2017 | Whitman | G06T 7/0002 |
| 2018/0293498 A1 | 10/2018 | Campos et al. | |
| 2019/0121350 A1 | 4/2019 | Cella et al. | |
| 2020/0285970 A1* | 9/2020 | Dagley | G06Q 10/20 |
| 2021/0133670 A1* | 5/2021 | Cella | G06N 3/044 |
| 2021/0165659 A1 | 6/2021 | Balasubramanian et al. | |
| 2021/0398227 A1* | 12/2021 | Hayward | G08B 23/00 |
| 2022/0005002 A1 | 1/2022 | Graf von Stauffenberg | |
| 2022/0121921 A1 | 4/2022 | Chen et al. | |
| 2023/0028266 A1* | 1/2023 | Mohanty | G06N 20/20 |

FOREIGN PATENT DOCUMENTS

| | | |
|---|---|---|
| CN | 119692918 A | 3/2025 |
| EP | 4031861 A1 | 7/2023 |
| JP | 2013539102 A | 10/2013 |
| JP | 5800903 B2 | 10/2015 |
| WO | 2007095566 A2 | 8/2007 |
| WO | 2018099920 A1 | 6/2018 |
| WO | 2022174340 A1 | 8/2022 |

OTHER PUBLICATIONS

Di Stefano, "Machine learning in real estate: an innovation catalyst," https://www.itransition.com/machine-learning/real-estate, Retrieved from the Internet: Aug. 10, 2023.

Constantinescu, "Machine-Learning Real Estate Valuation: Not Only a Data Affair," https://towardsdatascience.com/machine-learning-real-estate-valuation-not-only-a-data-affair-99d36c92d263, Mar. 14, 2019.

Paz Cuturi, et al., "Real Estate pricing with Machine Learning & non-traditional data sources," https://tryolabs.com/blog/2021/06/25/real-estate-pricing-with-machine-learning--non-traditional-data-sources, Jun. 25, 2021.

Faithfull, "Sustainability at a crossroads in cost crunch," https://www.beyondretailindustry.com/retail/sustainability-at-a-crossroads-in-cost-crunch/#:~:text=As%20MAPIC%20approaches%2C%20sustainability%20is,across%20most%20of%20the%20world, Nov. 11, 2022.

IBM, "2022 ESG Report," https://www.ibm.com/impact/files/reports-policies/2022/IBM_2022_ESG_Report.pdf, Apr. 11, 2023.

* cited by examiner

SELECTIVELY DISPOSING OF A PHYSICAL ASSET

BACKGROUND

One or more embodiments relate to managing physical assets of an enterprise, and more specifically, to selecting approaches to dispose of physical assets.

SUMMARY

The following presents a summary to provide a basic understanding of one or more embodiments of the disclosure. This summary is not intended to identify key or critical elements, or to delineate any scope of particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can utilize an intermediate dataset to generate a test diffusion model.

According to some embodiments described herein, a system is provided. The system can include a memory that stores computer executable components. The system can also include a processor, operably coupled to the memory, which can execute the computer executable components stored in the memory. The computer executable components can include a disposition component that can select a disposition for a physical asset of an organization based on a characteristic of the physical asset and a machine learning model trained based on dispositions of other physical assets of the organization. The computer executable components can further include an assignment component that can assign the physical asset to the disposition, resulting in an assigned disposition.

In additional, or alternative embodiments, the characteristic can include a maintenance history of the physical asset, comprising maintenance performed on the physical asset. In additional, or alternative embodiments, the characteristic can include a material composition of the physical asset, wherein the machine learning model is trained further based on material compositions of the other physical assets of the organization. In additional, or alternative embodiments, the disposition can be further based on a governmental regulation associated with disposing the physical asset composed of the material composition. In additional, or alternative embodiments, the disposition can be further based on an estimated environmental impact of disposing the physical asset composed of the material composition.

In additional, or alternative embodiments, the disposition can include conveying the physical asset to a geographic location for disposal, and wherein the estimated environmental impact can include an estimated environmental impact on the geographic location. In additional, or alternative embodiments, the computer-executable components further comprise a reverse logistical component that determines reverse logistics associated with a disposition that can include conveying the physical asset back to an original supplier of the physical asset. In additional, or alternative embodiments, the characteristic can further include a cost to the organization of the disposition of the physical asset, wherein the machine learning model is trained further based on respective costs of disposing of the other physical assets of the organization. In additional, or alternative embodiments, the computer-executable components can further include a disposing component that facilitates disposing of the physical asset in accordance with the assigned disposition.

According to one or more example embodiments, a computer-implemented method is provided. The computer-implemented method can include selecting a disposition for a physical asset of an organization based on a characteristic of the physical asset and a machine learning model trained based on dispositions of other physical assets of the organization. The computer-implemented method can further include assigning the physical asset to the disposition, resulting in an assigned disposition.

In additional, or alternative embodiments, the characteristic can include a maintenance history of the physical asset, comprising maintenance performed on the physical asset. In additional, or alternative embodiments, the characteristic can include a material composition of the physical asset, wherein the machine learning model is trained further based on material compositions of the other physical assets of the organization. In additional, or alternative embodiments, the disposition can be further based on a governmental regulation associated with disposing the physical asset composed of the material composition.

In additional, or alternative embodiments, the disposition can be further based on an estimated environmental impact of disposing the physical asset composed of the material composition. In additional, or alternative embodiments, the disposition can include conveying the physical asset to a geographic location for disposal, and wherein the estimated environmental impact can include an estimated environmental impact on the geographic location. In additional, or alternative embodiments, the computer-implemented method further can include, determining, by the device, reverse logistics associated with a disposition that can include conveying the physical asset back to an original supplier of the physical asset.

According to other example embodiments, a computer program product that selectively disposing of a physical asset. The computer program product can comprise a computer readable storage medium having program instructions embodied therewith. The program instructions can be executable by a processor to cause the processor to select a disposition for a physical asset of an organization based on a characteristic of the physical asset and a machine learning model trained based on dispositions of other physical assets of the organization. In different embodiments, the program instructions can further include assigning the physical asset to the disposition, resulting in an assigned disposition.

In additional, or alternative embodiments, the characteristic can include a maintenance history of the physical asset, comprising maintenance performed on the physical asset. In additional, or alternative embodiments, the characteristic can include a material composition of the physical asset, wherein the machine learning model is trained further based on material compositions of the other physical assets of the organization. In additional, or alternative embodiments, the disposition can be further based on a governmental regulation associated with disposing the physical asset composed of the material composition.

Other embodiments may become apparent from the following detailed description when taken in conjunction with the drawings.

BRIEF DESCRIPTION OF THE DRAWINGS

In certain embodiments, the present invention is described with reference to accompanying figures. The figures provided herein are intended to facilitate a clear understanding of the invention and are not intended to limit the scope or functionality of the invention in any way.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section. One or more embodiments are now described with reference to the drawings, with like referenced numerals being used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
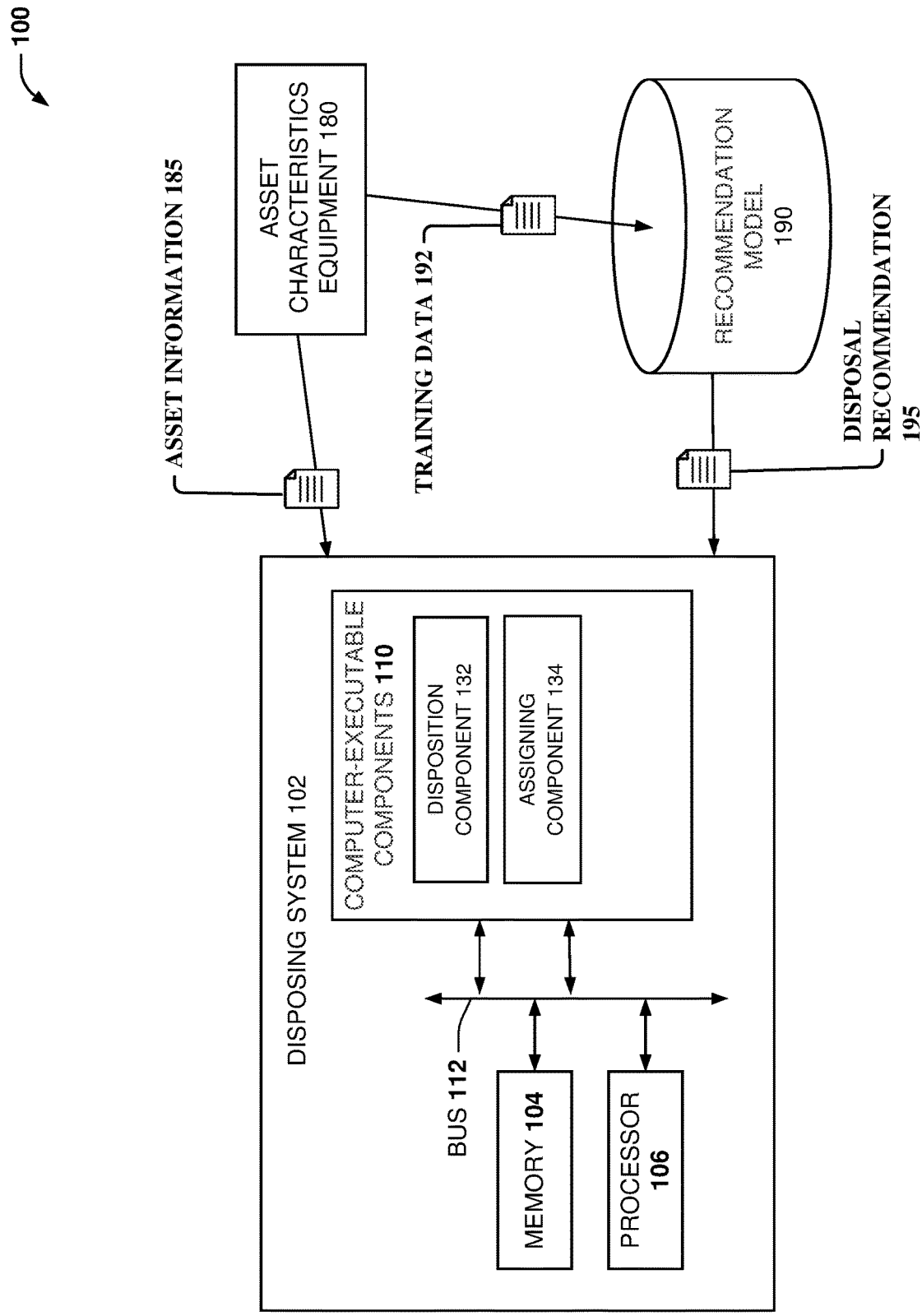
FIG. 1 illustrates a block diagram of an example system that can facilitate selectively disposing of a physical asset, in accordance with one or more embodiments described herein.

FIG. 1 illustrates a block diagram of an example system 100 that can facilitate selectively disposing of a physical asset, in accordance with one or more embodiments described herein. Embodiments of systems, apparatuses or processes in various embodiments of the present disclosure can constitute one or more machine-executable components embodied within one or more machines, e.g., embodied in one or more computer readable mediums (or media) associated with one or more machines. Such components, when executed by the one or more machines, (e.g., computers, computing devices, virtual machines), can cause the machines to perform the operations described. Repetitive description of like elements and processes employed in respective embodiments is omitted for sake of brevity.

As depicted, system 100 can include disposing system 102 receiving asset information 185 from asset characteristics equipment 180, and receiving disposal recommendation 195 from recommendation model 190. In one or more implementations, as further discussed with FIG. 4 below, asset characteristics equipment 180 can provide training data 192 to train recommendation model 190. In some embodiments, disposing system 102 can comprise memory 104, processor 106, and computer-executable components 110, coupled to bus 112.

It should be noted that, when an element is referred to herein as being "coupled" to another element, it can describe one or more different types of coupling. For example, when an element is referred to herein as being "coupled" to another element, it can be described one or more different types of coupling including, but not limited to, chemical coupling, communicative coupling, capacitive coupling, electrical coupling, electromagnetic coupling, inductive coupling, operative coupling, optical coupling, physical coupling, thermal coupling, and another type of coupling.

In one or more embodiments, disposing system 102 can be operated using any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the disposing system 102 and/or any other suitable device that can employ information provided by disposing system 102 and can enable computer-executable components 110, discussed below. As depicted, computer-executable components 110 can include disposition component 132, assignment component 134, and any other components associated with disposing system 102 that can combine to provide different functions described herein.

Memory 104 can comprise volatile memory (e.g., random access memory (RAM), static RAM (SRAM), dynamic RAM (DRAM), etc.) and non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to volatile memory 912 of FIG. 9. Such examples of memory 104 can be employed to implement any of the embodiments described herein.

In one or more embodiments, memory 104 can store one or more computer and machine readable, writable, and executable components and instructions that, when executed by processor 106 (e.g., a classical processor, and a quantum processor), can perform operations defined by the executable components and instructions. For example, memory 104 can store computer and machine readable, writable, and computer-executable components 110 and instructions that, when executed by processor 106, can execute the various functions described herein relating to disposing system 102, including disposition component 132, assignment component 134, and other components described herein with or without reference to the various figures of the one or more embodiments described herein.

Processor 106 can comprise one or more types of processors and electronic circuitry (e.g., a classical processor, and a quantum processor) that can implement one or more computer and machine readable, writable, and executable components and instructions that can be stored on memory 104. For example, processor 106 can perform various operations that can be specified by such computer and machine readable, writable, and executable components and instructions including, but not limited to, logic, control, input/output (I/O), arithmetic, and the like. In some embodiments, processor 106 can comprise one or more central processing unit, multi-core processor, microprocessor, dual microprocessors, microcontroller, System on a Chip (SOC), array processor, vector processor, quantum processor, and another type of processor. Further examples of processor 106 are described below with reference to processor set 910 of FIG. 9. Such examples of processor 106 can be employed to implement any embodiments described herein.

As discussed below, stored data can have been generated by a type of artificial neural network (ANN), and be stored in storage that can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store information for embodiments and which can be accessed by the computer.

As depicted, memory 104, processor 106, disposition component 132, assignment component 134, and any other component of disposing system 102 described or suggested herein, can be communicatively, electrically, operatively, and optically coupled to one another via bus 112, to perform functions of disposing system 102, and any components coupled thereto. Bus 112 can comprise one or more of a memory bus, memory controller, peripheral bus, external bus, local bus, a quantum bus, and another type of bus that can employ various bus architectures. Further examples of connections similar to bus 112 are described below with reference to computer 901 of FIG. 9. Such examples of bus 112 can be employed to implement any of the embodiments described herein.

In one or more embodiments described herein, disposing system 102 can utilize disposition component 132 to perform (e.g., via processor 106) operations including, but not limited to, select a disposition for a physical asset of an organization based on a characteristic of the physical asset and a machine learning model trained based on dispositions of other physical assets of the organization. In additional embodiments described herein, disposing system 102 can utilize assignment component 134 to perform (e.g., via processor 106) operations including, but not limited to, assign the physical asset to the disposition, resulting in an assigned disposition.

It should be appreciated that the embodiments described herein depict in various figures disclosed herein are for illustration only, and as such, the architecture of such embodiments are not limited to the systems, devices, and components depicted therein. For example, in some embodiments, disposing system 102 can further comprise various computer and computing-based elements described herein with reference to sections below such as FIG. 9. In various embodiments, components of the disposing system 102 (such as disposition component 132 and assignment component 134) can include functional elements that can be implemented via cloud technologies, physical components (for example, computer hardware) and local software (for example, an application on a mobile phone or an electronic device).

Figure 2:
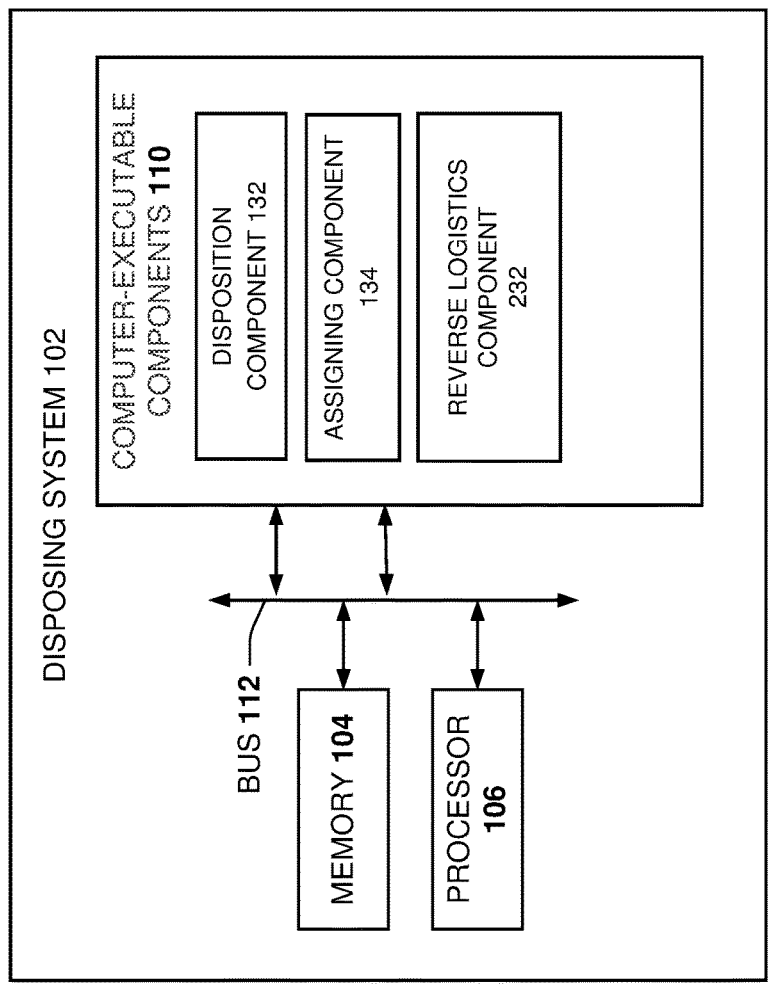
FIG. 2 illustrates a block diagram of an example system that can facilitate selectively disposing of a physical asset, in accordance with one or more embodiments described herein.

FIG. 2 illustrates a block diagram of an example system 200 that can facilitate selectively disposing of a physical asset, in accordance with one or more embodiments described herein. Repetitive description of like elements employed in one or more embodiments described herein is omitted for sake of brevity. As used herein, a diffusion model can broadly refer to a model that, based on the probability distribution of a dataset, can generate new samples that resemble the original dataset by gradually refining random guesses based on learned patterns.

As depicted, system 200 includes the components of disposing system 102 described in FIG. 1, with the addition of reverse logistics component 232 to computer executable components 110. In one or more embodiments described herein, disposing system 102 can utilize reverse logistics component 232 to perform (e.g., via processor 106) operations including, but not limited to, determining reverse logistics associated with a disposition that can include conveying the physical asset back to an original supplier of the physical asset.

Figure 3:
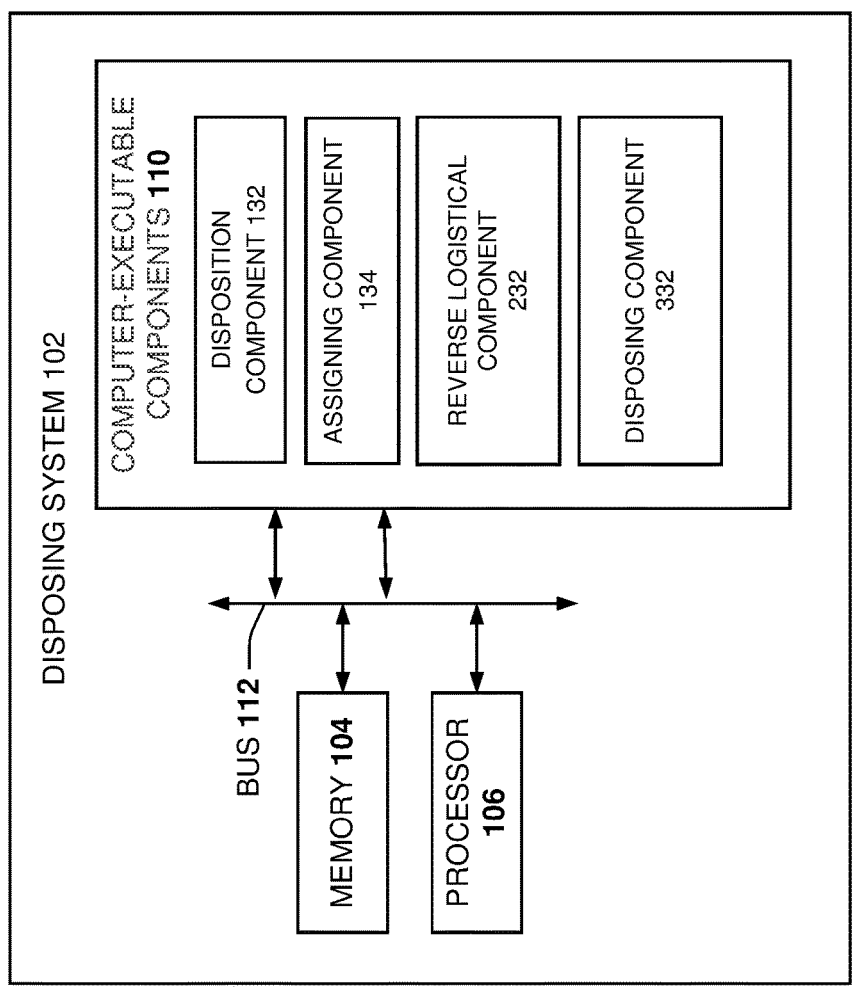
FIG. 3 illustrates a block diagram of an example system that can facilitate selectively disposing of a physical asset, in accordance with one or more embodiments described herein.

FIG. 3 illustrates a block diagram of an example system 300 that can facilitate selectively disposing of a physical asset, in accordance with one or more embodiments described herein. Repetitive description of like elements employed in one or more embodiments described herein is omitted for sake of brevity. As used herein, a diffusion model can broadly refer to a model that, based on the probability distribution of a dataset, can generate new samples that resemble the original dataset by gradually refining random guesses based on learned patterns.

As depicted, system 300 includes the components of disposing system 102 described in FIG. 2, with the addition of disposing component 332 to computer executable components 110. In one or more embodiments described herein, disposing system 102 can utilize disposing component 332 to perform (e.g., via processor 106) operations including, but not limited to facilitate disposing of the physical asset in accordance with the assigned disposition, e.g., determined by assignment component 134, as noted above.

Figure 4:
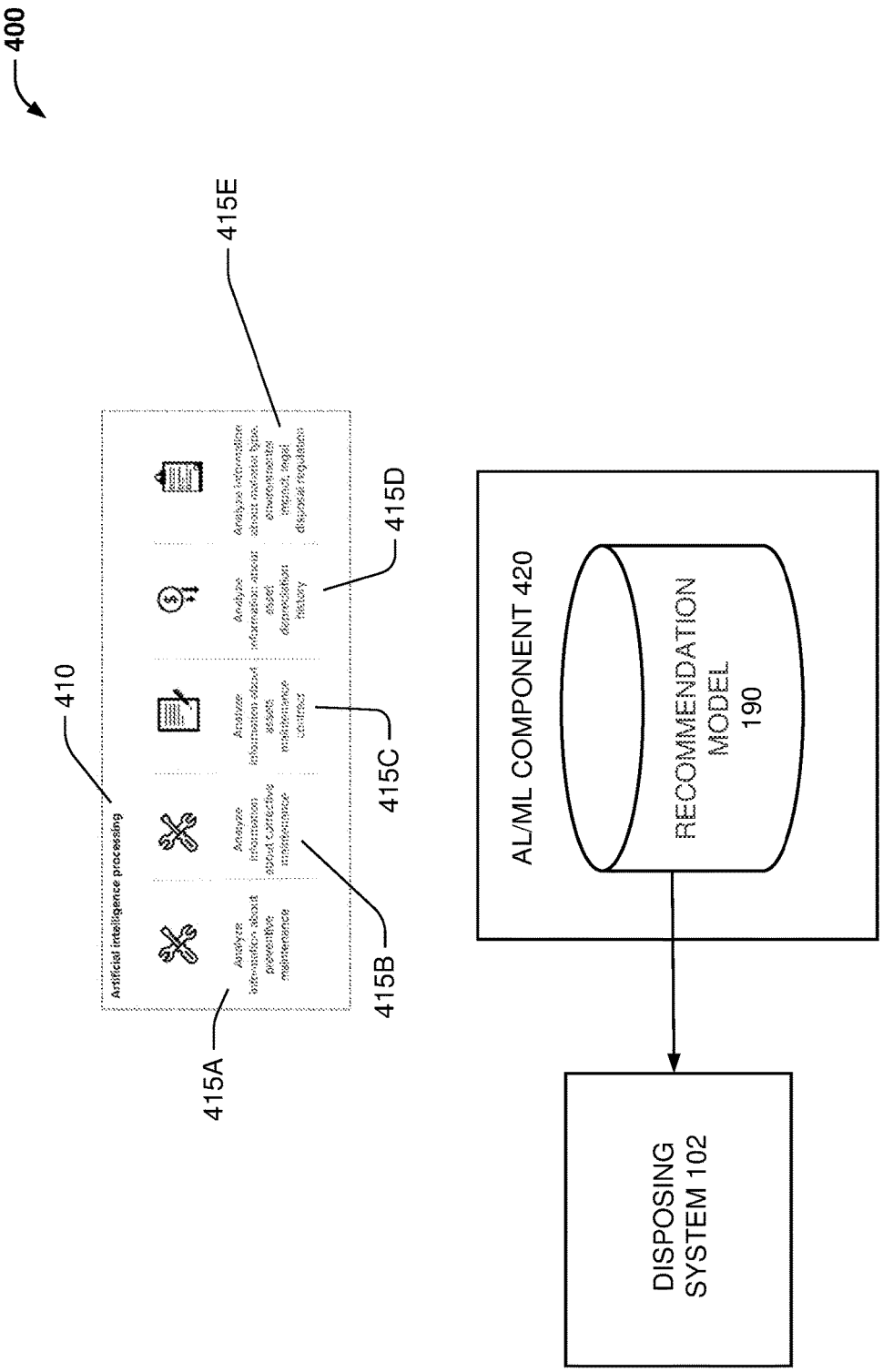
FIG. 4 illustrates a block diagram of an example system that can utilize artificial intelligence/machine learning technologies to facilitate selectively disposing of a physical asset, in accordance with one or more embodiments described herein.

FIG. 4 illustrates a block diagram of an example system 400 that can utilize artificial intelligence (AI)/machine learning (ML) technologies that can facilitate selectively disposing of a physical asset, in accordance with one or more embodiments described herein. Repetitive description of like elements employed in one or more embodiments described herein is omitted for sake of brevity. Various embodiments herein can employ artificial-intelligence and/or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

As depicted, system 400 can include AI/ML component coupled to disposing system 102. To illustrate various processes that can be performed by AI/ML component 420, AI processing 410 provides examples 415A-E of different types of physical asset related data that can be analyzed and used to train recommendation model 190. It is noted that systems and/or associated controllers, servers, or machine learning components herein can comprise artificial intelligence component(s) which can employ an AI model and/or ML model that can learn to perform the above or below described functions (e.g., via training using historical training data and/or feedback data).

In some embodiments, AI/ML component 420 can comprise an AI and/or ML model (e.g., recommendation model 190) that can be trained (e.g., via supervised and/or unsupervised techniques) to perform the recommendation described herein functions using historical training data comprising various context conditions that correspond to various activities associated with the acquisition, maintenance, and disposal of physical assets by an organization. In this example, such an AI and/or ML model can further learn (e.g., via supervised and/or unsupervised techniques) to perform the recommendation functions using training data comprising data associated with physical assets, where such data can be collected and/or stored (e.g., in memory) by AL/ML component 420. In this example, such feedback data can comprise the various instructions described above/below that can be input, for instance, to a system herein, over time in response to observed/stored context-based information.

AI/ML components herein can initiate an operation(s) associated with a defined level of confidence determined using information (e.g., feedback data). For example, based on learning to perform such functions described above using feedback data, performance information, and/or past performance information herein, AI/ML component 420 can initiate an operation associated with determining various thresholds herein (e.g., input pattern thresholds, similarity thresholds, or other suitable thresholds).

In an embodiment, AI/ML component 420 can perform a utility-based analysis that factors cost of initiating the above-described operations versus benefit. In this embodiment, AI/ML component 420 can use one or more additional context conditions to determine various thresholds herein. For example, AI processing 410 activities can include, but are not limited to, analyzing 415A information about preventive maintenance, analyzing 415B information about corrective maintenance, analyzing 415C information about assets maintenance contract, analyzing 415D information about asset depreciation history, and analyzing 415E information about material type, environmental impact, legal disposal regulation.

To facilitate the above-described functions, AI/ML component 420 can perform classifications, correlations, inferences, and/or expressions associated with principles of artificial intelligence. For instance, AI/ML component 420 can employ an automatic classification system and/or an automatic classification. In one example, AI/ML component 420 can employ a probabilistic and/or statistical-based analysis (e.g., factoring into the analysis utilities and costs) to learn and/or generate inferences. AI/ML component 420 can employ any suitable machine-learning based techniques, statistical-based techniques and/or probabilistic-based techniques. For example, AI/ML component 420 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, AI/ML component 420 can perform a set of machine-learning computations. For instance, AI/ML component 420 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 5:
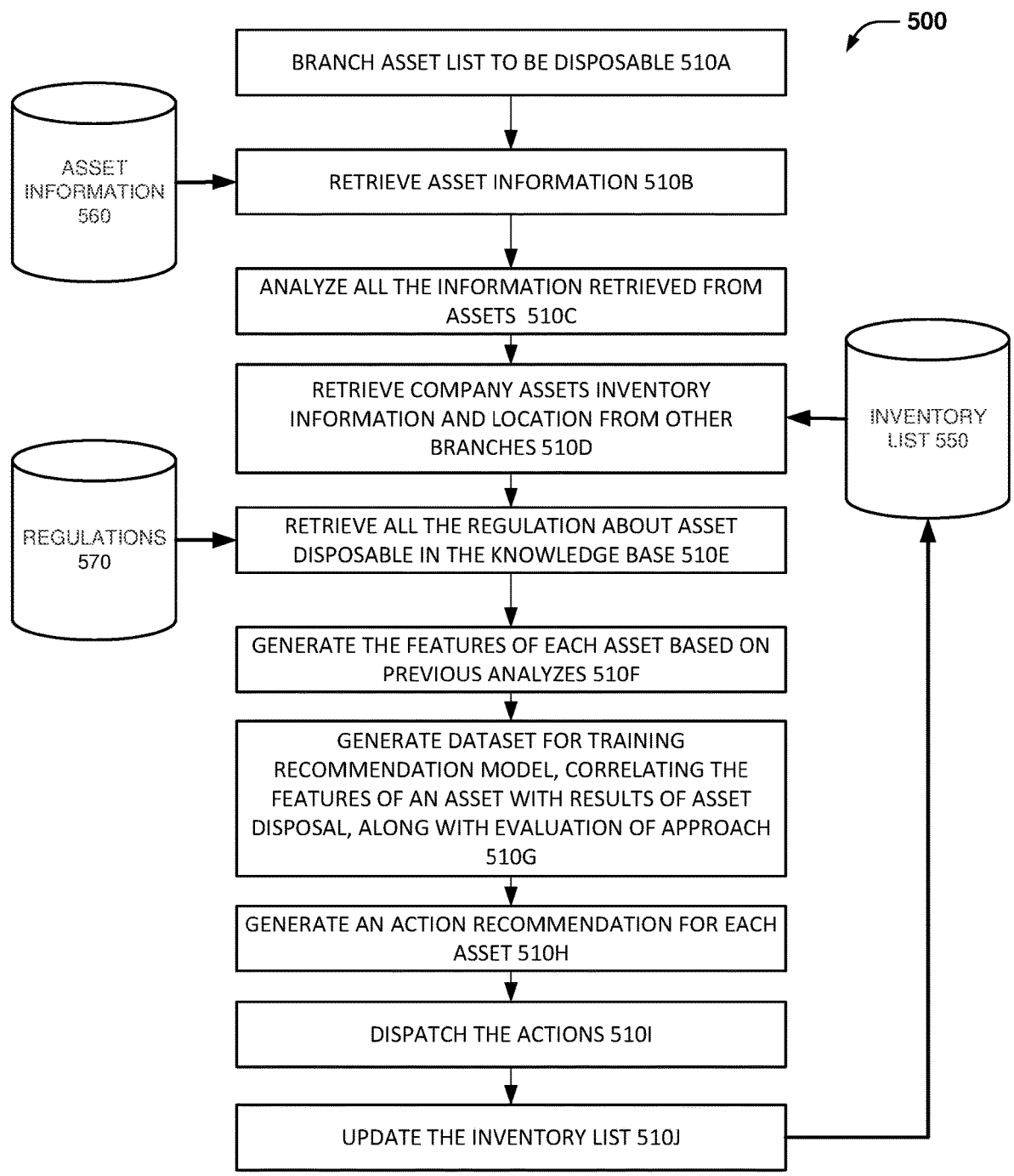
FIG. 5 illustrates a block diagram of an example system that can facilitate selectively disposing of a physical asset, in accordance with one or more embodiments described herein.

FIG. 5 illustrates a block diagram of an example system 500 that can facilitate selectively disposing of a physical asset, in accordance with one or more embodiments described herein. Repetitive description of like elements employed in one or more embodiments described herein is omitted for sake of brevity.

In one or more embodiments, asset information 560 can include, but is not limited to, preventive maintenance history, corrective maintenance history, asset depreciation history, type of material used to compose asset, environmental impact of disposal, active maintenance contracts, current guarantees, relocation history of asset to another locations, drop-in specific locations used for asset, approaches to disposing of asset through reverse logistics (e.g., reverse logistics component 232), opportunities to donate an asset, opportunities to evaluate/terminate active preventive/corrective maintenance contracts, etc. In one or more embodiments, regulations 570 can include, but is not limited to, legal/governmental regulations associated with disposal. At 510A, one or more embodiments can receive an input of assets to be managed, e.g., disposed, reallocated, etc. At 510B, asset information can be retrieved from enterprise data system, e.g., asset information 560.

In some implementations, blocks 510C-G describe processes by which asset information can be analyzed and features of assets can be extracted. At 510C, asset information can be analyzed that can include, but is not limited to, preventive maintenance, corrective maintenance, asset maintenance contracts, asset situation, and or other considerations. At 510D, one or more embodiments can get information about other enterprise branch locations, and other assets that are similar to the ones that will be disposable. At 510E, one or more embodiments can retrieve information about different relevant regulations about asset and material disposal, e.g., regulations regarding disposal of assets composed of wood or metal, with batteries, etc. At 510F, one or more embodiments can, based on each type of information analyzed generate relevant features for a particular asset. One or more embodiments can obtain descriptive terms via language models. In addition, aggregated analysis of asset disposal can be used to assist with recommendations, For example, an average number of corrective/preventative maintenances can be analyzed for each type of asset, average cost for each type of maintenance, etc.

At 510G, one or more embodiments generate a dataset for training recommendation model 190, correlating the features of an asset with results of asset disposal, along with evaluation of approach. At 510H, one or more embodiments can, based on the recommendation, generate a disposal action for each asset, e.g., utilizing disposing component 332. At 510I, one or more embodiments can automatically dispatch the actions, e.g., by utilizing disposing component 332 described above. At 510J, one or more embodiments can update inventory list 550 based on the asset data collected and analyzed.

Figure 6:
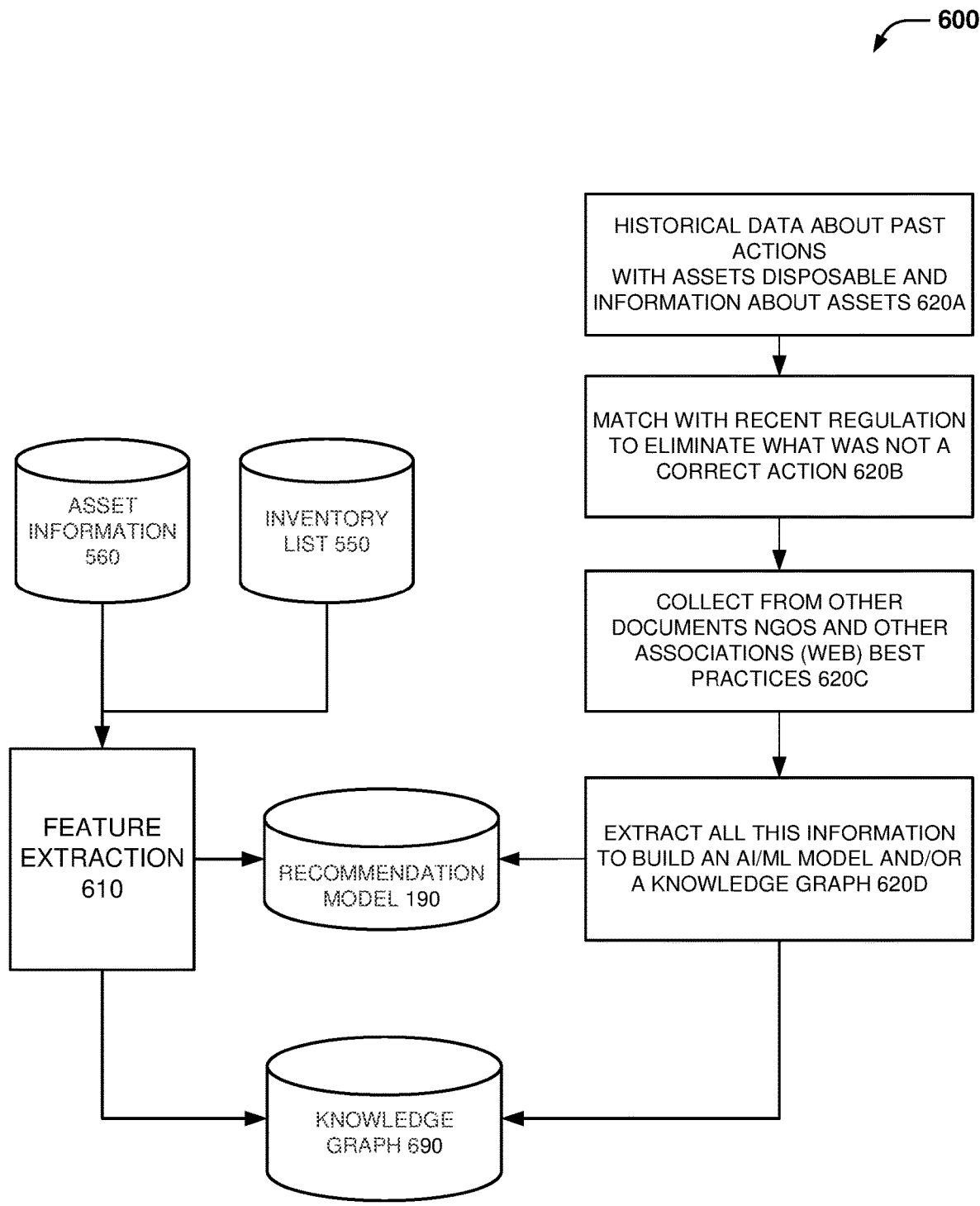
FIG. 6 illustrates a block diagram of an example system that can facilitate selectively disposing of a physical asset, in accordance with one or more embodiments described herein.

FIG. 6 illustrates a block diagram of an example system 600 that can facilitate selectively disposing of a physical asset, in accordance with one or more embodiments described herein. Repetitive description of like elements employed in one or more embodiments described herein is omitted for sake of brevity.

At 610, one or more embodiments can extract information from asset information 560 and inventory list 550, e.g., as documents and/or stored structured information. At 620A, one or more embodiments can access the historical information about past assets that were disposable, the action taken and the asset information. At 620B, one or more embodiments can match this historical information about the actions taken with regulations to be applied to assets to be disposed.

At 620C, one or more embodiments can collect updated information about best practices associated with disposal of a particular asset, e.g., from non-governmental organizations, or other associations and cooperatives. At 620E, one or more embodiments can create an AI/ML model (e.g., recommendation model 190) as described with FIG. 4 above, e.g., including, but not limited to artificial neural network, random forest, and/or distributed gradient boosting libraries, etc. One or more embodiments can also create a knowledge graph 690 from the information collected as described above.

Figure 7:
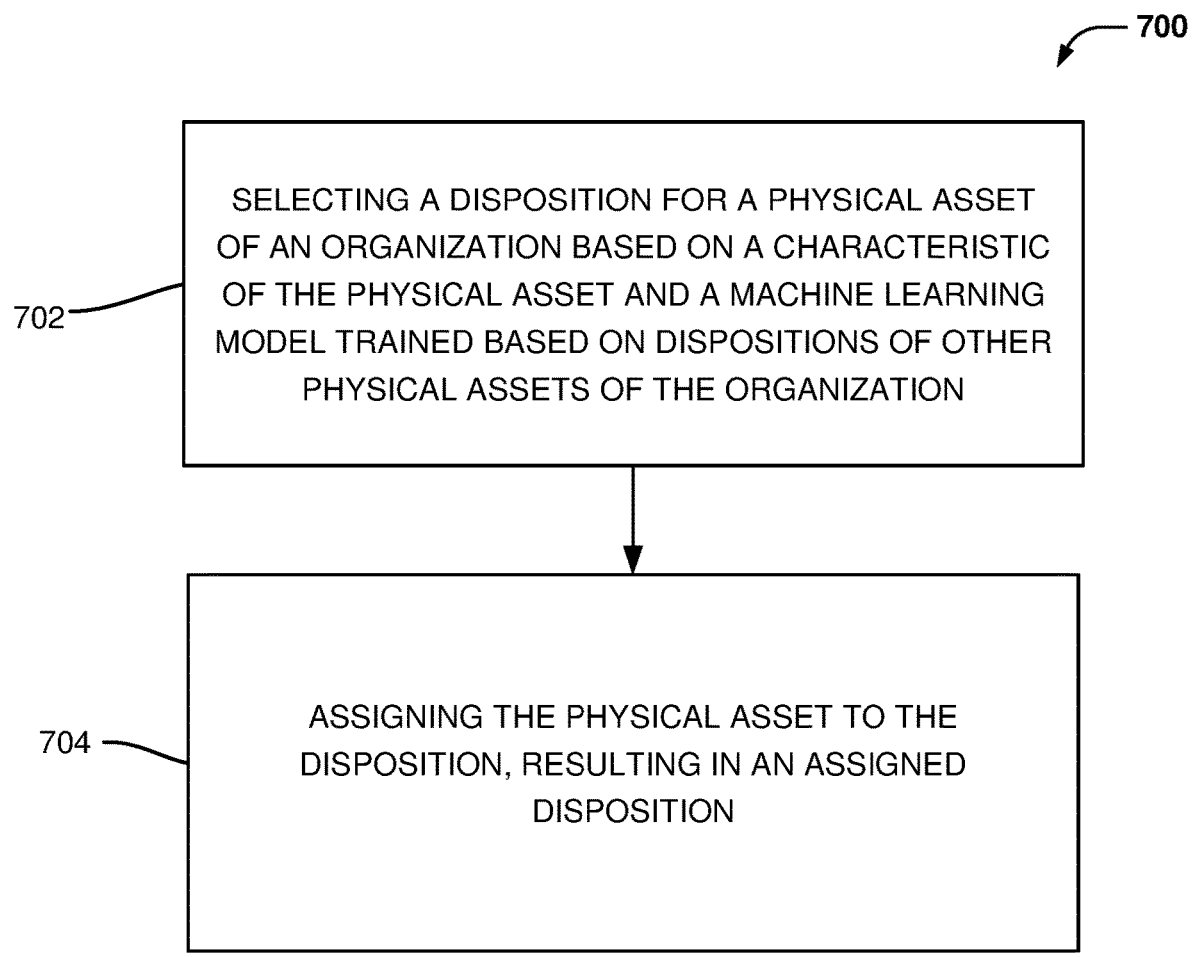
FIG. 7 illustrates a flow diagram of an example non-limiting computer-implemented method that can facilitate selectively disposing of a physical asset in accordance with one or more embodiments described herein.

FIG. 7 illustrates a flow diagram of an example, non-limiting computer-implemented method 700 that can facilitate selectively disposing of a physical asset in accordance with one or more embodiments described herein. Repetitive description of like elements and processes employed in respective embodiments is omitted for sake of brevity.

At 702, computer-implemented method 700 can include selecting a disposition for a physical asset of an organization based on a characteristic of the physical asset and a machine learning model trained based on dispositions of other physical assets of the organization. At 704, computer-implemented method 700 can include assigning the physical asset to the disposition, resulting in an assigned disposition.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Figure 8:
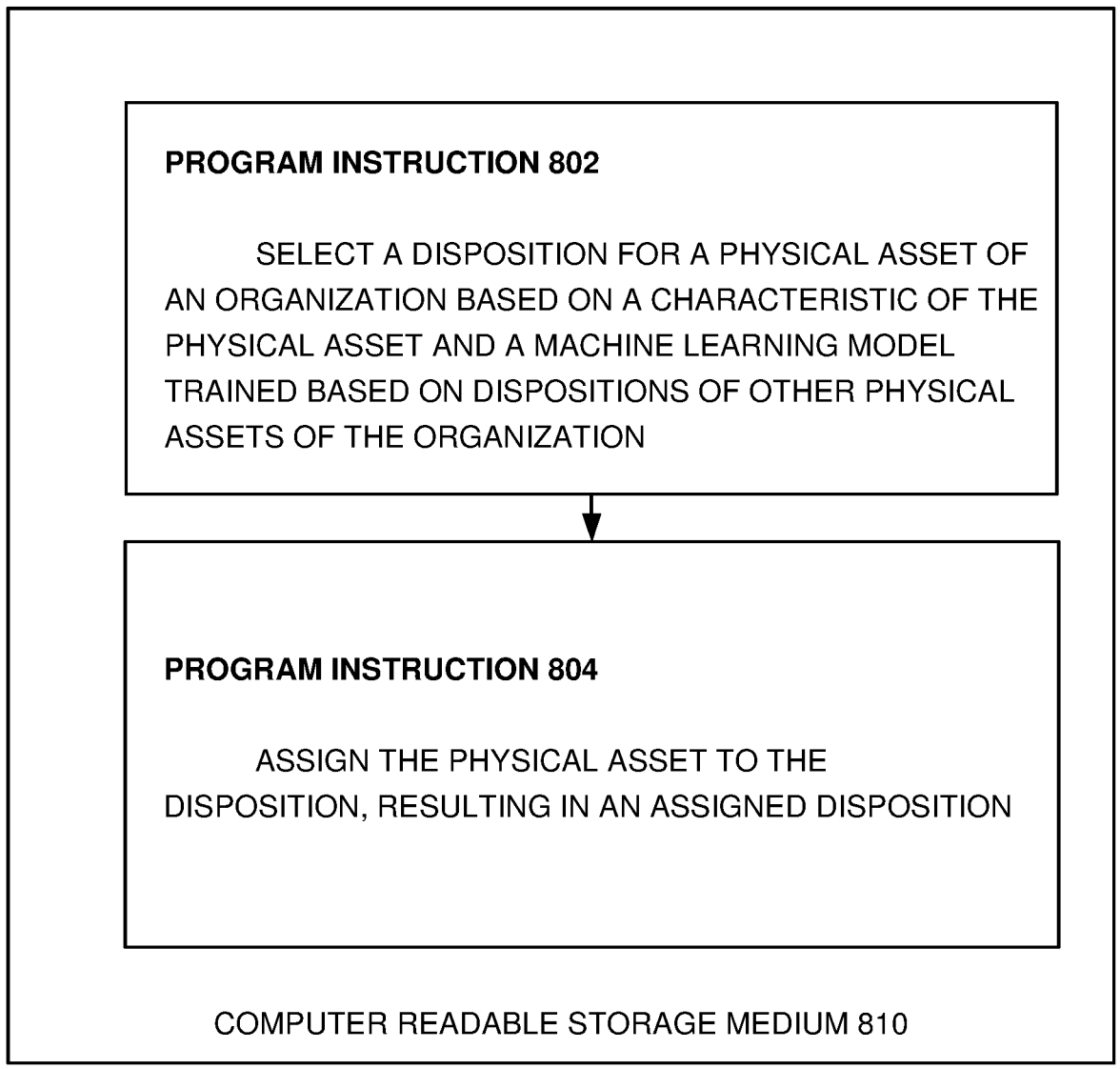
FIG. 8 depicts an example computer-program product (CPP) that can include executable instructions that, when executed by a processor of a system, can facilitate selectively disposing of a physical asset, in accordance with one or more embodiments.

FIG. 8 depicts an example 800 computer-program product (CPP) that can include executable instructions that, when executed by a processor of a system, can facilitate selectively disposing of a physical asset, in accordance with one or more embodiments. For purposes of brevity, description of like elements and/or processes employed in other embodiments is omitted.

In one or more embodiments, operation 802 of FIG. 8 can identify qualitative information related a forecasting model of an operation of a modeled system, with the forecasting model being generated by modeling the modeled system based on a dataset. In one or more embodiments, operation 804 of FIG. 8 can modify the forecasting model based on intervention information generated based on the qualitative information, wherein the intervention information is associated with a prediction of the forecasting model.

Figure 9:
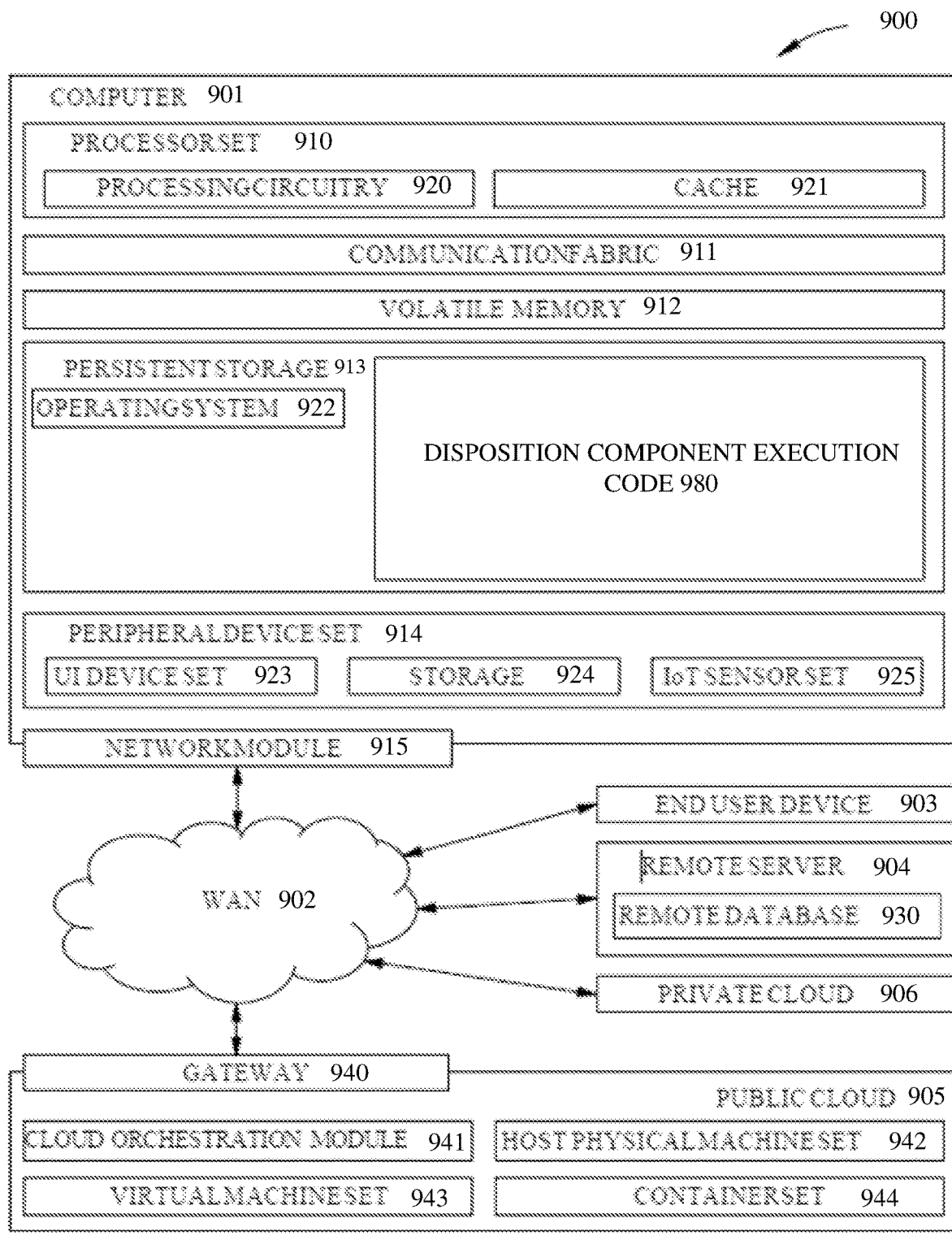
FIG. 9 includes a computing environment as an example of an environment for the execution of at least some of the computer code involved in performing the methods described herein.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

Various aspects of the present disclosure are described by narrative text, flowcharts, block diagrams of computer systems and/or block diagrams of the machine logic included in CPP embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze complex characteristics of combinations of physical assets, along with different approaches to managing and disposing of such assets. And, neither can the human mind nor a human with pen and paper maintain extensive and complicated records of enterprise asset management over time.

FIG. 9 includes computing environment 900 as an example of an environment for the execution of at least some of the computer code involved in performing the methods described herein, such as implementation of a disposition component (e.g., disposition component 132) by disposition component execution code 980. In addition to block 980, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 980, as identified above), peripheral device set 914 (including user interface (UI), device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 980 in persistent storage 913.

COMMUNICATION FABRIC 911 is the signal conduction paths that allow the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, the volatile memory is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface type operating systems that employ a kernel. The code included in block 980 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

What is claimed is:

1. A system comprising:
a memory that stores computer-executable components; and
a processor that executes at least one of the computer-executable components that:
selects, by the processor, using a machine learning model, a disposition for a physical asset of an organization based on a characteristic of the physical asset, wherein the machine learning model is trained based on historical dispositions of other physical assets of the organization;
assigns, by the processor, using the machine learning model, the physical asset to the disposition, resulting in an assigned disposition;
generates, by the processor, using the machine learning model, a disposal action for the assigned disposition based on an analysis of logistics costs and an environmental impact associated with a defined geographic location that factors a material composition of the physical asset and a defined legal regulation associated with the disposition of the physical asset; and
automatically dispatches, by the processor, using the machine learning model, the disposal action for the assigned disposition to perform the disposal of the physical asset.

2. The system of claim 1, wherein the characteristic comprises a maintenance history of the physical asset, comprising maintenance performed on the physical asset.

3. The system of claim 1, wherein the characteristic comprises the material composition of the physical asset, wherein the machine learning model is trained further based on material compositions of the other physical assets of the organization.

4. The system of claim 1, wherein the disposition comprises conveying the physical asset to the defined geographic location for disposal.

5. The system of claim 1, where the logistics costs comprise a reverse logistics associated with conveying the physical asset back to an original supplier of the physical asset.

6. The system of claim 1, wherein the characteristic comprises a cost to the organization of the disposition of the physical asset, wherein the machine learning model is trained further based on respective costs of disposing of the other physical assets of the organization.

7. The system of claim 1, where the analysis comprises a utility analysis that factors a benefit of taking the disposal action versus a cost of the disposal action being an incorrect action.

8. A computer-implemented method, comprising:
selecting, by a device operatively coupled to a processor, using a machine learning model, a disposition for a physical asset of an organization based on a characteristic of the physical asset, wherein the machine learning model is trained based on historical dispositions of other physical assets of the organization;
assigning, by the device, using the machine learning model, the physical asset to the disposition, resulting in an assigned disposition;
generating, by the device, using the machine learning model, a disposal action for the assigned disposition based on an analysis of logistics costs and an environmental impact associated with a defined geographic location that factors a material composition of the physical asset and a defined legal regulation associated with the disposition of the physical asset; and
automatically dispatching, by the device, using the machine learning model, the disposal action for the assigned disposition to perform the disposal of the physical asset.

9. The computer-implemented method of claim 8, wherein the characteristic comprises a maintenance history of the physical asset, comprising maintenance performed on the physical asset.

10. The computer-implemented method of claim 8, wherein the characteristic comprises the material composition of the physical asset, wherein the machine learning model is trained further based on material compositions of the other physical assets of the organization.

11. The computer-implemented method of claim 8, wherein the disposition comprises conveying the physical asset to the defined geographic location for disposal.

12. The computer-implemented method of claim 8, wherein the logistics costs comprise a reverse logistics associated with conveying the physical asset back to an original supplier of the physical asset.

13. A computer program product that selects a disposition for a physical asset of an organization, the computer program product comprising a computer readable storage medium having program instructions embodied therewith, the program instructions executable by a processor to cause the processor to:
select by the processor, using a machine learning model, the disposition for the physical asset based on a characteristic of the physical asset, wherein the machine learning model is trained based on historical dispositions of other physical assets of the organization;
assign, by the processor, using the machine learning model, the physical asset to the disposition, resulting in an assigned disposition;
generate, by the processor, using the machine learning model, a disposal action for the assigned disposition based on an analysis of logistics costs and an environmental impact associated with a defined geographic location that factors a material composition of the physical asset and a defined legal regulation associated with the disposition of the physical asset; and
automatically dispatch, by the processor, using the machine learning model, the disposal action for the assigned disposition to perform the disposal of the physical asset.

14. The computer program product of claim 13, wherein the characteristic comprises a maintenance history of the physical asset, comprising maintenance performed on the physical asset.

15. The computer program product of claim 13, wherein the characteristic comprises the material composition of the physical asset, wherein the machine learning model is trained further based on material compositions of the other physical assets of the organization.

16. The computer program product of claim 13, wherein the disposition comprises conveying the physical asset to the defined geographic location for disposal.

17. The computer program product of claim 13, wherein logistics costs comprise a reverse logistics associated with conveying the physical asset back to an original supplier of the physical asset.

18. The computer program product of claim 13, wherein the characteristic comprises a cost to the organization of the disposition of the physical asset, wherein the machine learning model is trained further based on respective costs of disposing of the other physical assets of the organization.

19. The computer program product of claim 13, where the analysis comprises a utility analysis that factors a benefit of taking the disposal action versus a cost of the disposal action being an incorrect action.

20. The computer-implemented method of claim 8, wherein the characteristic comprises a cost to the organization of the disposition of the physical asset, wherein the machine learning model is trained further based on respective costs of disposing of the other physical assets of the organization.

* * * * *